United States Patent [19]

Lipowski et al.

[11] Patent Number: 4,505,833
[45] Date of Patent: Mar. 19, 1985

[54] STABILIZING CLAYEY FORMATIONS

[75] Inventors: Stanley A. Lipowski, Livingston; John J. Miskel, Jr., Mendham, both of N.J.; Martin J. Schick, New York, N.Y.

[73] Assignee: Diamond Shamrock Chemicals Company, Dallas, Tex.

[21] Appl. No.: 538,211

[22] Filed: Oct. 3, 1983

[51] Int. Cl.$^3$ .............................................. C09K 7/00
[52] U.S. Cl. .................................. 252/8.5 C; 166/295; 166/305 R; 252/8.5 R; 252/8.5 A; 252/8.55 R; 252/8.55 C; 564/281; 564/286; 564/295
[58] Field of Search ........................... 166/295, 305 R; 252/8.5 R, 8.5 A, 8.5 C, 8.55 R, 8.55 C; 564/281, 286, 295

[56] References Cited

U.S. PATENT DOCUMENTS

| | | | |
|---|---|---|---|
| 3,349,032 | 10/1967 | Krieg | 252/8.55 D |
| 3,500,925 | 3/1970 | Beiswanger et al. | 166/305 R |
| 4,158,521 | 6/1979 | Anderson et al. | 166/305 R |
| 4,366,071 | 12/1982 | McLaughlin et al. | 252/8.5 C |

*Primary Examiner*—Leland A. Sebastian
*Attorney, Agent, or Firm*—Leslie G. Nunn, Jr.

[57] ABSTRACT

Process for treating a clayey geological formation to prevent, inhibit or reduce swelling or migrating of clay particles in a formation by treating the formation with an effective amount of a quaternized oligomer which is the reaction product of a polyamine having a primary amino group and a tertiary amino group with a difunctional reactant to form a precondensate monomer which is then chain extended and quaternized by reaction with a dihalogenated hydrocarbon ether.

A preferred oligomer is a product of:
(I) about 1.0 mole of a precondensate which is the reaction product of
 (A) from about 2.0 to about 3.0 mole of a polyamine having a primary amino group and a tertiary amino group, the polyamine having a non-cyclic backbone containing between 1 and 6 carbon atoms, with
 (B) about 1.0 mole of a difunctional reactant which is a diester of a mixture of dicarboxylic acids such as adipic, glutaric and succinic acid, with
(II) from about 1.0 to about 1.2 mole of a chain extender such as dichloroethylether.

Process is useful in oil producing operations.

12 Claims, No Drawings

STABILIZING CLAYEY FORMATIONS

BACKGROUND OF THE INVENTION

1. Field of the Invention

This invention relates to a method of stabilizing clayey geological formations by treatment with a quaternized oligomer.

2. Description of the Prior Art

When geological formations containing water swelling clays come in contact with water, particularly fresh water, clays in the formations may swell and/or disperse with attendant loss of permeability and/or mechanical strength to interfere with recovery of petroleum or other minerals from the formations. Clayey formations are often impermeable or have low permeability or lose part or all of their permeability on contact of the clays with water or water base systems such as injection fluids, drilling muds, stimulation fluids and gels.

Clays in formations can reduce permeability by swelling or migrating to form bridges or blockages in formation pores or screens used in well completions. Swelling and migrating occur when aqueous fluids used in oil recovery come in contact with the clays. High swelling clays used in drilling fluids may also invade a permeable producing formation during drilling to create low permeability zone in the vicinity of the borehole.

U.S. Pat. No. 3,349,032—Krieg, issued Oct. 24, 1967, describes a process for preventing, inhibiting or reducing "clay blocking" or plugging of oil producing clayey formations during oil recovery by adding a polyquaternary amine.

U.S. Pat. No. 3,500,925—Beiswanger et al, issued Mar. 17, 1970, describes a process for improving flow rate of injection water through oil producing formations during oil recovery by adding a water soluble polymer of a N-vinyl lactam and a water soluble salt.

U.S. Pat. No. 4,158,521—Anderson et al, issued June 19, 1979, describes treating with a solution of a reaction product of dimethylamine and epichlorohydrin to stabilize clay containing formations in oil and gas producing boreholes after these formations are penetrated.

U.S. Pat. No. 4,366,071—McLaughlin et al, issued Dec. 28, 1982, describes a method of preventing or reducing swelling, migrating or dispersing of clay in an oil producing formation by treating the clay with an organic polycationic polymer dissolved in a carrier to stabilize the clay against dispersion or expansion by water.

SUMMARY OF THE INVENTION

A process for treating a clayey geological formation to prevent, inhibit or reduce swelling or migrating of clay particles in the formation by treating the formation with an effective amount of a quaternized oligomer which is the reaction product of a polyamine having a primary amino group and a tertiary amino group with a difunctional reactant to form a precondensate monomer which is then chain extended and quaternized by reaction with a dihalogenated hydrocarbon ether.

Useful quaternized oligomers are products of:
(I) about 1.0 mole of a precondensate which is the reaction product of
   (A) from about 2.0 to about 3.0 mole of a polyamine having a primary amino group and a tertiary amino group, the polyamine having a non-cyclic backbone containing between 1 and 18 carbon atoms, with
   (B) about 1.0 mole of a difunctional reactant which is
      (1) urea, guanidine, guanylurea, or alkyl substituted urea having from 1 to 3 carbon atoms in the alkyl moiety, or
      (2) a non-cyclic dicarboxylic acid having a total of from 2 to 36 carbon atoms, monoamide, diamide, anhydride, diester or monoester thereof with
(II) from about 1.0 to about 1.5 mole of a chain extender which is a non-cyclic dihalogenated hydrocarbon ether which is a monoether having a total of from 2 to 12 carbon atoms or polyether having a total of from 3 to 30 carbon atoms and from 2 to 6 ether linkages.

The preferred oligomers are products of:
(I) about 1.0 mole of a precondensate which is the reaction product of
   (A) from about 2.0 to about 3.0 mole of a polyamine having a primary amino group and a tertiary amino group, the polyamine having a non-cyclic backbone containing between 1 and 6 carbon atoms, with
   (B) about 1.0 mole of a difunctional reactant which is a diester of a mixture of dicarboxylic acids such as adipic, glutaric and succinic acid, with
(II) from about 1.0 to about 1.2 mole of a chain extender which is dichloroethyl ether.

DETAILED DESCRIPTION

This invention uses oligomers to prevent or reduce the adverse effects of swelling clays and/or migrating fines in clayey geological formations. An aqueous solution of the oligomer is flowed past the clay to be treated without dispersing the formation particles until the oligomer replaces the clay cation, normally sodium ion, and transforms the clay to a more stable form that is much less likely to swell or migrate. Oligomers used in this invention have several advantages. They can be applied to all types of formations regardless of carbonate content. They are acid resistant. The formation can be treated with acid later, without destroying their clay treating ability. They are placeable in water solutions including a wide range of brines and acids. The treatment with oligomers is essentially permanent. Oligomers are very resistant to removal by brines, oils or acids. Oil wetting of formations can be avoided. Formations can be made pH tolerant. A very short cure time is required. Tests indicate that less than one minute is required for adsorption of the oligomer on clay to be complete. Very low permeability formations can be treated. They can have high permeability retention after clays and fines are treated. Formation having temperatures from about 70° F. to about 500° F. can be treated with oligomers and used.

Clayey geological formations are stabilized by treating the formations with a solution of a carrier fluid containing an effective amount of a quaternized oligomer which is the reaction product of a polyamine having a primary amino group and a tertiary amino group with a difunctional reactant to form a precondensate monomer which is then chain extended and quaternized by reaction with a dihalogenated hydrocarbon ether. These solutions are prepared using water, ethanol, ethylene glycol, hydrochloric acid, hydrofluoric acid or other suitable carrier fluid. Brine is the preferred carrier fluid, particularly an 8% by weight sodium chloride solution.

Concentration of the quaternized oligomer employed in the treating solutions will vary according to size and porosity of the particular formation, type of clay present therein and solvent used. Generally, concentrations of from about 0.5 to about 25.0 pounds per thousand gallons of treating solution have been found to be effective. Concentrations in the range of 2 to 25 pounds per thousand gallons of treating solution are preferred. Flow data with respect to formation permeability may be used to determine how much of treating agent should be employed to insure effective treatment. More precise calculations of the amount of quaternized oligomer treating agent necessary for treatment of any specific formation may be estimated by calculating the milliequivalent base-exchange capacity of the clay formation to be treated and supply at least 1, and preferably more, milliequivalents of the oligomer.

Treatment of clayey geological formations with the oligomer can be accomplished by any suitable method which provides effective and intimate contact between the solution and the clay. When treating a formation adjacent to the well bore, the oligomer solution can be spotted adjacent to the formation being treated and then allowed to penetrate into the formation using pressure if necessary. When gun or jet perforating the casing, the solution can be spotted in the interval of the borehole being perforated before the gun or jet is discharged. In oil recovery, the solution can be used in front of the flood to stabilize the clayey formation as the flood precedes through the formation to prevent any decline in injection rate caused by swelling or dispersing of the clay. In the producing formation in the immediate vicinity of the borehole, production can be stimulated by injecting sufficient treating solution to penetrate from about 3 to about 20 feet into the formation and then resuming oil production.

Wells being drilled with air or gas are often troubled by the swelling and heaving of formations traversed by the well bore. When these formations contain clay minerals, aqueous fluids such as mist or foam will cause sloughing of the formation and sticking of the drill string and/or bit in the hole. Some of these formations are known as "gumbo shale." Treatment and/or impregnation of these formations with oligomer solutions can alleviate the danger of swelling or heaving formations. This treatment can also be used in drilling or completion operations where two-phase fluids, such as emulsion, foam, fog, smoke or gaseous dispersion, mist or slurry, are used.

Acidizing is a common technique in improving well production. Acid is pumped into the formation to enlarge the pores and increase permeability. Hydrochloric acid is commonly used in carbonate formations such as limestone and dolomite and hydrofluoric acid solutions in sandstones. In some formations, acidizing loosens fines so that they migrate and cause plugging. A characteristic of these formations is that acidizing improves production, but a decline in production rate soon sets in as fines migrate to plugging positions. Use of oligomer solutions before, during and/or after acidizing minimizes fines production.

Hydraulic fracturing is a common technique in improving oil well production. The well bore is pressured until the formation bursts and the resulting fracture exposes large areas of producing formation face. The cracks are normally prevented from healing and closing by pumping sand into the fracture. However, fracturing fluid that bleeds into the fracture face often interacts with clays and damages permeability. This damage is particularly critical when the permeability is low, i.e., about 10 millidarcies to 0.1 millidarcy. The oligomer solution is used in conjunction with fracturing operations.

A preferred method for treating a clay-containing formation is to stabilize it by contact with an oligomer solution using the following procedure. The clayey formation is contacted with a nonswelling aqueous solution of potassium chloride, ammonium chloride, calcium chloride, sodium chloride and mixtures thereof. An effective amount of oligomer solution, preferably in brine (8% NaCl) is then introduced into the formation. The formation is "afterflushed." This method insures that the oligomer is spread into sections of the formation which were not contacted during direct introduction of the oligomer solution. The afterflush preferably will be a brine introduced for that purpose but can be accomplished incidentally such as where the primary treatment is fracturing and the oligomer, clay stabilization agent is incorporated in the fracturing fluid.

Useful quaternized oligomers are products of:
(I) about 1.0 mole of a precondensate which is the reaction product of
  (A) from about 2.0 to about 3.0 mole of a polyamine having a primary amino group and a tertiary amino group, the polyamine having a non-cyclic backbone containing between 1 and 18 carbon atoms, with
  (B) about 1.0 mole of a difunctional reactant which is
    (1) urea, guanidine, guanylurea, or alkyl substituted urea having from 1 to 3 carbon atoms in the alkyl moiety, or
    (2) a non-cyclic dicarboxylic acid having a total of from 2 to 36 carbon atoms, monoamide, diamide, anhydride, diester or monoester thereof with
(II) from about 1.0 to about 1.5 mole of a chain extender which is a non-cyclic dihalogenated hydrocarbon ether which is a monoether having a total of from 2 to 12 carbon atoms or polyether having a total of from 3 to 30 carbon atoms and from 2 to 6 ether linkages.

These quaternized oligomers are described in U.S. Pat. No. 3,734,889—Lipowski et al, issued May 22, 1973. They are prepared from polyamines having only one primary amino group and only one tertiary amino group. Polyamines may have more than two amino groups with diamines being preferred.

The carbon chain backbone in the polyamine is non-cyclic, is between 1 and 18 carbon atoms and may be branched or straight chain, saturated or unsaturated. Useful polyamines include, but are not limited to:
methylethylaminolaurylamine,
dimethylaminopropylamine,
methyl bis(3-aminopropyl)amine,
methyl bis(3-aminoethyl)amine,
N-(2-aminoethyl)piperazine,
dimethyltriethylenetetramine,
diethylaminopropylamine,
aminodiethylaminostearyl alcohol,
N'bis(propylaminoethyl)butylenediamine,
bis(aminopropyl)propanediamine,
aminotripropylamine,
dimethylaminoallylamine, and
diethanolaminododecylamine.
Dimethylaminopropylamine is a preferred polyamine.

The difunctional reactant which is condensed with the polyamine to form a pre-condensate monomoner is either (A) urea, guanidine, guanylurea, alkyl substituted ureas having from one to 3 carbon atoms in the alkyl moiety and mixtures thereof; or (B) non-cyclic dicarboxylic acids having a total of from 2 to 36 carbon atoms, which may be saturated or unsaturated, branched or straight chain and substituted or unsubstituted, their monoamides, the diamides, their anhydrides, their diesters, their monoesters and mixtures thereof. Thioureas and isothioureas are not used in this invention. Useful dicarboxylic acids include, but are not limited to, oxalic, malonic, succinic, glutaric, adipic, pimelic, suberic, azealic, sebacic, fumaric, itaconic, citraconic, phthalic, terephthalic, maleic, brassic, brassylic and roccellic acids and dimer acids. Preferred difunctional reactants are urea, adipic acid or its esters.

The chain extender is a dihalogenated hydrocarbon ether whose carbon backbone may be straight or branched chain, saturated or unsaturated, and which if a monoether must have a total of from 2 to 12 carbon atoms and if a polyether must have a total of from 3 to 30 carbon atoms with from 2 to 6 ether linkages. These chain extenders include, but are not limited to: triglycoldichloride, dichloroethylether, difluoroisobutylether, dibromomethylether, diiododecylpolyether, dichlorononylpolyether, difluorotetrabutyldecylpolyether, and the like, and mixtures thereof. Dichloroethylether is a preferred chain extender.

Among the clays which may be present originally in geological formations, or may have been introduced therein, that can be effectively treated with oligomers are clay materials of the smectite (montmorillonite) group such as montmorillonite, saponite, nontronite, hectorite, beidellite, and sauconite; the kaolin group such as kaolinite, nacrite, dickite, endellite and halloysite; the illite (hydrous-mica) group such as hydrobiotite, glauconite, and illite; the chlorite group such as chlorite, greenalite and chamosite; clay minerals not belonging to the above groups such as vermiculite, palygorskite (attapulgite) and sepiolite; and mixed-layer (both regular and irregular) varieties of the above minerals. The clay content of the formations can be a single species of a clay mineral or several species, including the mixed-layer types of clay. Of the clay minerals commonly encountered in the drilling of wells in geological formations which can cause the difficulties described above and which can be treated effectively with oligomers are clay minerals such as the montmorillonite, illite (hydrous-mica) chlorite and/or kaolin groups. It is to be understood that clayey formations treated with oligomers need not be entirely of clay but may contain other mineral components. Formations which are largely clay can, upon contact with water, or water containing fluids, swell and these swelled clays can develop pressures of several thousand pounds per square inch.

For a fuller understanding of the nature and advantages of this invention, reference may be made to the following examples. These examples are given merely to illustrate the invention and are not to be construed in a limiting sense. All quantities, proportions and percentages are by weight and all references to temperature are °C. unless otherwise indicated.

EXAMPLE I (A) Preparation of a urea and a primary-tertiary amine pre-condensate 300 grams (5 moles) of urea and 1020 grams (10 moles) of dimethylaminopropylamine were charged to a reaction flask equipped with stirrer, condenser, thermometer and attached to a second flask equipped with a dropping funnel. 600 grams of water and 10 drops of phenolphthalein indicator were added to the second flask and 980 grams of a 50% by weight sulfuric acid solution were placed in the dropping funnel. The mixture in the first flask was heated slowly over 1 hour. At a temperature of about 118° C., ammonia gas started to escape vigorously and was absorbed in the water. Sulfuric acid solution was added gradually to the water in the absorption flask and the conversion rate in the reaction flask was followed by observing the color change of the indicator. After 45 minutes of reaction, the temperature reached 126° C. and the conversion was 33% complete. After an additional two hours, temperature rose to 147° C. and the conversion was 70% complete. At this point, the reaction slowed down and more heat was applied to continue the condensation. After 1.25 hours more (total reaction time of 5 hours), the temperature reached 205° C. Reflux of the mixture practically stopped and the conversion was close to 100%. The precondensate was cooled to 25° C. and 1150 grams of the precondensate were recovered as a light, yellow colored, syrupy liquid. 170 grams of the mixture escaped as ammonia (10 moles). Viscosity of the precondensate was 270 centipoise as measured on a Brookfield viscometer, spindle No. 2 at 60 rpm. pH of the precondensate was 11.4 and the pH of a 5% water solution was 10.8. Analysis of the precondensate for amine content gave the following values:

|  | Percent |
| --- | --- |
| Primary amine | 0 |
| Secondary amine | 0.5 |
| Tertiary amine | 48.5 |

(B) Preparation of an oligomer from the precondensate of Example I (A) and dichloroethylether 1150 grams (5 moles) of the precondensate prepared in Example I (A) and 1000 grams water were mixed together and heated to a gentle reflux. 715 grams (5 moles) of dichloroethylether were added gradually over ½ hour and the mixture was refluxed for an additional two hours. The final reflux temperature was 110° C. The reaction product, the oligomer, was then cooled to room temperature (25° C.) and recovered as a light yellow, syrupy liquid having a viscosity of 2225 centipoise, as measured on Brookfield viscometer spindle No. 2 at 6 rpm, containing 67% solids and having a pH of 8.3.

EXAMPLE II (A) Preparation of a mixed dibasic ester and dimethylaminopropylamine precondensate 170 grams (1.036 mole) of mixed dibasic methyl esters, containing a mixture of adipic acid dimethyl ester, glutaric acid dimethyl ester, succinic acid dimethyl ester and having an average molecular weight of 164 were charged to a reaction flask equipped with a stirrer, a condenser, a thermometer and a trap. 204 grams (2 moles) of dimethylaminopropylamine were added and the mixture was heated slowly from room temperature (23° C.) to the boiling temperature (134° C.). Temperature of the mixture was then raised to 136° C. and the distillate was collected in the attached trap. Heating was continued until the temperature reached 172° C.

The reaction mixture was then cooled to 90° C. and 43 grams (0.262 mole) of the mixed esters were added. The collected distillate was returned to the reaction mixture. The reaction mixture was heated slowly to 170° C.; distillate was again collected in the trap and after cooling of the reaction mixture to 85° C. returned the second time to reaction mixture. Then the reaction mixture was reheated slowly to 170° C. and a total of 75 cc of distillate was collected in the trap. The 75 cc of distillate collected was discarded and the precondensate was analyzed to obtain the following values:

Total alkali: 31.59% as KOH
Tertiary amine: 29.77% as KOH (B) Preparation of an oligomer from the condensate of Example II (A) and dichloroethylether To the precondensate from Example II (A), 140 grams water was added and mixed. 143 grams (1 mole) of dichloroethylether was added and the reaction mixture was heated slowly to the boiling point (102° C.). An exothermic reaction occurred and the reflux temperature rose to 116° C. Viscosity of the reaction mixture increased gradually and the mixture was refluxed for an additional 2 hours. 140 grams water was then added and the mixture agitated. The resulting product, the oligomer, was a clear dark brown liquid having 63% solids content, a pH of 5.3, and a viscosity as measured on Brookfield viscometer, spindle No. 1 at 30 rpm at 25° C. of 105 centipoise.

EXAMPLE III

Oligomers from Examples I (B) and II (B) were evaluated as clay stabilizing agents using the following procedure:

A one gram sample of clay (325 mesh betonite) was mixed with 40 cc of treating solution. Each treating solution was formulated to provide 0 (Blank) or 10 pounds of the oligomer from Example I (B) or II (B) per 1000 gallons of an 8% sodium chloride brine, buffered with approximately 10 pounds of sodium dihydrogen phosphate to obtain a pH of about 5.9.

The clay treating solution mixtures were allowed to soak for fifteen minutes and then centrifuged at 1000 rpm for five minutes. Fluid from the clay treating solution mixture was then decanted off the treated clay and approximately 41 cc of deionized water was thoroughly mixed with the treated clay. The clay water mixture was allowed to stand for fifteen minutes to hydrate and swell the clay and then centrifuged for about five minutes at 1000 rpm. Visual appearance of the clay and water were evaluated using the following criteria to measure effectiveness of the oligomers as treating agents:

(1) ml of swollen clay
(2) ml of floc (fine precipitate)
(3) ml of water and clarity of water (clear, slightly turbid, turbid or very turbid).

Results of these observations are recorded in Table I.

TABLE I

| Clay Stabilizing Agent | Swollen Clay (ml) | Floc (ml) | Volume of Water and Clarity |
|---|---|---|---|
| Example II (B) | 4.5 | 0.0 | 38 ml slightly turbid |
| Example I (B) | 7.0 | 0.0 | 36 ml slightly turbid |
| Blank | 27.0 | 0.0 | 16 ml slightly turbid |

The clay and water mixtures were then refluxed with 20% by weight hydrochloric acid for four hours, cooled, then centrifuged for about five minutes at 1000 rpm and observed. Results of these observations are recorded in Table II.

TABLE II

| Clay Stabilizing Agent | Swollen Clay (ml) | Floc (ml) | Volume of Water and Clarity |
|---|---|---|---|
| Example II (B) | 7.0 | 0.0 | 36 ml slightly turbid |
| Example I (B) | 10.0 | 0.0 | 34 ml slightly turbid |
| Blank | 22.0 | 0.0 | 23 ml slightly turbid |

While the invention has been described with reference to certain specific embodiments thereof, it is understood that it is not to be so limited since alterations and changes may be made therein which are within the full intended scope of the appended claims.

What is claimed is:

1. A method of stabilizing a clayey geological formation comprising treating the formation with a solution of carrier fluid containing an effective amount of a quaternized oligomer which is a reaction product of a precondensate of a polyamine having a primary amino group and a tertiary amino group with a difunctional reactant and then with a dihalogenated hydrocarbon ether to prevent, inhibit or reduce swelling or migrating of clay particles in the formation of swelling of clay particles in the carrier fluid.

2. The method of claim 1 wherein the oligomer is a product of
(I) about 1.0 mole of a precondensate which is a reaction product of
   (A) from about 2.0 to about 3.0 mole of a polyamine having a primary amino group and a tertiary amino group, the polyamine having a non-cyclic backbone containing between 1 and 18 carbon atoms, with
   (B) about 1.0 mole of a difunctional reactant which is
      (1) urea, guanidine, guanylurea, or alkyl substituted urea having from 1 to 3 carbon atoms in the alkyl moiety, or
      (2) a non-cyclic dicarboxylic acid having a total of from 2 to 36 carbon atoms, monoamide, diamide, anhydride, diester or monoester thereof with
(II) from about 1.0 to about 1.5 mole of a chain extender which is a non-cyclic dihalogenated hydrocarbon ether which is a monoether having a total of from 2 to 12 carbon atoms or polyether having a total of from 3 to 30 carbon atoms and from 2 to 6 ether linkages.

3. The method of claim 2 wherein the oligomer is a product of
(I) about 1.0 mole of a precondensate which is a reaction product of
   (A) from about 2.0 to about 3.0 mole of a polyamine having a primary amino group and a tertiary amino group, the polyamine having a non-cyclic backbone containing between 1 and 6 carbon atoms, with
   (B) about 1.0 mole of a difunctional reactant which is a diester of a mixture of dicarboxylic acids selected from the group consisting of adipic, glutaric and succinic acid, with
(II) from about 1.0 to about 1.2 mole of a chain extender which is dichloroethyl ether.

4. The method of claim 1 wherein the carrier fluid is water, ethanol, ethylene glycol, hydrochloric acid, hydrofluoric acid or brine.

5. The method of claim 1 wherein from about 0.5 to about 25.0 pounds of oligomer per thousand gallons of solution is present.

6. The method of claim 1 wherein the polyamine is selected from the group consisting of
methylethylaminolaurylamine,
dimethylaminopropylamine,
methyl bis(3-aminopropyl)amine,
methyl bis(3-aminoethyl)amine,
N-(2-aminoethyl)piperazine,
dimethyltriethylenetetramine,
diethylaminopropylamine,
aminodiethylaminostearyl alcohol,
N'bis(propylaminoethyl)butylenediamine,
bis(aminopropyl)propanediamine,
aminotripropylamine,
dimethylaminoallylamine, and
diethanolaminododecylamine.

7. The method of claim 2 wherein the dicarboxylic acid is selected from the group consisting of oxalic, malonic, succinic, glutaric, adipic, pimelic, suberic, azealic, sebacic, fumaric, itaconic, citraconic, phthalic, terephthalic, maleic, brassic, brassylic, roccellic and dimer acid.

8. The method of claim 1 wherein the dihalogenated hydrocarbon ether is selected from the group consisting of triglycoldichloride, dichloroethylether, difluoroisobutylether, dibromomethylether, diiododecylpolyether, dichlorononylpolyether and difluorotetrabutyldecylpolyether.

9. The method of claim 1 wherein the formation traversed by a well bore is treated during drilling to alleviate swelling or heaving of clay.

10. The method of claim 1 wherein a producing formation is treated during production to prevent swelling or dispersing of clay.

11. The method of claim 1 wherein a formation is treated during acidizing to prevent plugging or migrating of clay.

12. The method of claim 1 wherein a formation is treated during hydraulic fracturing to protect permeability.

* * * * *